United States Patent
Motoyama et al.

[19]

[11] Patent Number: 6,085,733
[45] Date of Patent: Jul. 11, 2000

[54] IGNITION CONTROL SYSTEM FOR ENGINE

[75] Inventors: Yu Motoyama; Miyoshi Ishibashi; Akihiko Ohokubo; Yoshihiko Moriya, all of Iwata, Japan

[73] Assignee: Yamaha Hatsudoki Kabushiki Kaisha, Iwata, Japan

[21] Appl. No.: 09/115,296

[22] Filed: Jul. 14, 1998

[30] Foreign Application Priority Data

Jul. 14, 1997 [JP] Japan .................................. 9-205232

[51] Int. Cl.⁷ .................................................. F02P 15/08
[52] U.S. Cl. ........................................................ 123/636
[58] Field of Search .................................. 123/295, 606, 123/607, 636, 637

[56] References Cited

U.S. PATENT DOCUMENTS

| 3,945,365 | 3/1976 | Regueiro | 123/260 |
| 4,349,008 | 9/1982 | Wainwright | 123/606 |
| 4,561,406 | 12/1985 | Ward | 123/606 |
| 4,677,960 | 7/1987 | Ward | 123/637 |
| 4,774,914 | 10/1988 | Ward | 123/636 |
| 5,170,760 | 12/1992 | Yamada et al. | 123/295 |
| 5,211,147 | 5/1993 | Ward | 123/637 |

*Primary Examiner*—Erick R. Solis
*Attorney, Agent, or Firm*—Knobbe, Martens, Olson & Bear LLP

[57] ABSTRACT

A direct cylinder injected engine in several different embodiments which are specifically illustrated as two-cycle engines but which can also be used in four-cycle engines. The fuel injector is positioned so as to minimize escape of fuel from the exhaust port in the two-cycle engine applications. In addition, multiple or extended spark plug firing is accomplished under difficult running conditions and wherein fuel vaporization may be incomplete. This will ensure complete combustion. Various control routines and strategies are disclosed that control the number or time of injection depending upon such factors as engine speed, load, speed variation, air fuel ratio variations and pressure variations.

18 Claims, 16 Drawing Sheets

IGNITION CONTROL SYSTEM FOR ENGINE

BACKGROUND OF THE INVENTION

This invention relates to an internal combustion engine and more particularly to an improved ignition control for an internal combustion engine and particularly one embodying direct cylinder injection.

In the interest of improving the performance of an internal combustion engine, direct cylinder injection has been resorted to. By injecting fuel directly into the combustion chamber of the engine, a number of advantages can be accomplished. One of these advantages it the ability to run the engine on less than stoichiometric mixture. This generally is referred to as "lean burn".

This is done primarily by stratifying the fuel air mixture in the combustion chamber. When stratification is employed, the goal is to have a stoichiometric mixture present at the gap of the spark plug at the time of firing. This will ensure the initiation of combustion. The remainder of the charge in the combustion chamber need not be stoichiometric and hence, it is possible to obtain improved fuel economy and exhaust emission control if stratification can be successfully accomplished.

A problem in connection with achieving stratification, however, is that the stoichiometric patch of fuel must be at the spark gap at the time of firing and must be capable of being burned. This frequently gives a problem, particularly under a number of running conditions where the total charge in the combustion chamber is much less than stoichiometric.

Various arrangements have been proposed in order to ensure that the stoichiometric mixture is present at the spark gap at the time of firing. Even these, however, do present some difficulties.

It is, therefore, a principal object of this invention to provide an improved engine control system that permits operation on a lean fuel air charge.

It is a further object of this invention to provide an improved method of operating a direct injected internal combustion engine.

In addition to the ability to obtain better stratification, direct cylinder injection also has other advantages. However, like most features in engine design, there are trade-offs that result. That is, there are some areas where direct cylinder injection may have problems regardless of whether stratification is accomplished or even desired.

One of the problems with direct cylinder injection is to control the pressure of the fuel that is injected and to avoid impingement of the fuel on surfaces in the combustion chamber which may be at either too high or too low a temperature. If the temperature is too high where the fuel is injected, combustion may occur before the desired time. If the temperature is too low, the mixture may not ignite even though it is rich enough to ignite under normal conditions.

It is, therefore, a still further object of this invention to provide an improved engine control for an engine having direct injection wherein it will be ensured that the mixture is ignited and completely burned.

It is a further object of this invention to provide an improved ignition system, an ignition control system for a direct injected engine.

One type of engine that can benefit significantly from direct injection is a two-cycle engine. Two-cycle engines because of their porting overlap do present significant problems in exhaust emission control. Direct cylinder injection can be utilized to more closely control the amount of fuel and the emission control.

One problem with direct injection, however, is that at times the fuel may be injected when the exhaust port is open. If this is done, there is a risk that fuel can escape out of the exhaust port before it has been burned.

It is, therefore, a still further object of this invention to provide an improved direct injection system for a two-cycle engine and associated engine control that will ensure that fuel cannot escape from the combustion chamber before it has had an opportunity to burn.

One of the disadvantages of direct cylinder injection with both two and four cycle engines is that the fuel injectors are generally more expensive and more prone to developing problems than with manifold injection. This is because the injector is normally exposed directly to the combustion in the combustion chamber. This requires higher cost injectors and also raises the problem of contamination or damage to the injector.

It has been proposed, therefore, to position the fuel injector in an area where it will be shielded by the piston during at least the initial combustion phase. In this way, the lower cost injectors can be employed and the injector is less likely to become contaminated. However, this then raises the additional problem that the time for fuel injection is shortened. Thus, it may be difficult to provide adequate fuel for complete combustion, particularly when operating on a two-stroke cycle.

It is, therefore, a still further object of this invention to provide an improved injection and engine control system for a direct injected engine wherein the injector is shielded during at least a portion of the combustion cycle.

One way of ensuring good and/or complete combustion, particularly when operating in a stratified charge mode has been to extend the duration of spark firing and/or changing the energy level during firing. The spark duration can be extended by various methods one of which includes multiple firing of the spark plug. Such an arrangement is disclosed in the U.S. Pat. No. 5,170,760 issued Dec. 15, 1992 and entitled "Ignition System For Two-Cycle Engine." Basically, that control determines whether the engine is operating on either a homogeneous mixture or a stratified mixture. The spark control is based primarily on this determination.

It has been found, however, that although that system is effective, the switching between multiple firing and single firing need not depend solely or even primarily on whether the mixture is stratified or homogeneous. In fact, it has been found that other running conditions may dictate multiple firings and the optimum number of firings may vary depending upon a wide variety of running conditions.

It is, therefore, a further principal object of this invention to provide an improved ignition control for an engine having direct cylinder injection wherein the spark control varies between single and multiple ignitions and the number of multiple ignitions is varied depending upon a wide variety of engine running conditions.

SUMMARY OF THE INVENTION

This invention is adapted to be embodied in an internal combustion engine and control method therefore where the engine has at least one combustion chamber. A fuel injector is provided for injecting fuel directly into the combustion chambers. At least one spark plug is positioned in the combustion chamber for firing a charge therein. An ignition system is provided for controlling the firing of the spark plug. At least two sensors are provided for sensing at least two different engine running conditions. Means are provided for delivering the output from the sensors to the ignition system for controlling the timing of firing of the spark plug and either the number of firings or the duration of firing during a single combustion cycle.

An engine that practices one feature of the invention employs a control which determines during the multiple firing stage the number of firings necessitated by each of the sensed conditions and sums those numbers of firing to determine the total number of firings of the spark plug during the single combustion cycle.

An engine that practices another feature of the invention employs a control which determines during the firing stage the time of firing necessitated by each of the sensed conditions and sums those times to determine the total time of firing of the spark plug during the single combustion cycle.

In accordance with one feature of a method for practicing the invention, the spark is controlled during the multiple spark phase by determining the number of firings required for each of the two sensed conditions and then summing those numbers to arrive at the final number of spark firings.

In accordance with another feature of a method for practicing the invention, the time of sparking is controlled by determining the time of firing required for each of the two sensed conditions and then summing those times to arrive at the final duration of spark firing.

DETAILED DESCRIPTION OF THE PREFERRED EMBODIMENTS

Figure 1:
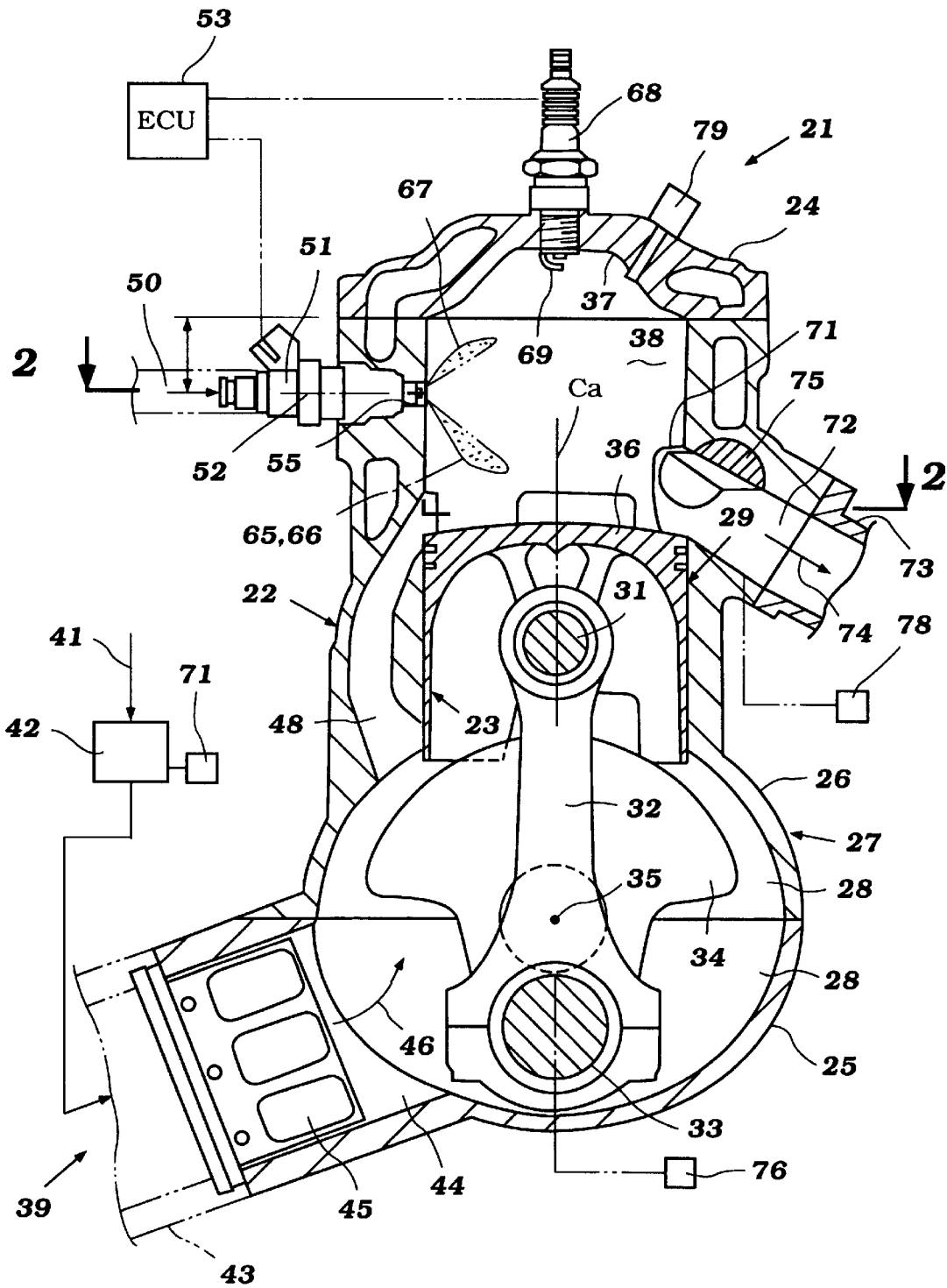
FIG. 1 is a cross-sectional view taken through a single cylinder of an engine constructed and operated in accordance with the embodiments of the invention.

Referring now in detail to the drawings and initially to the first embodiment and primarily to the engine shown in FIG. 1, an internal combustion engine constructed and operated in accordance with the several embodiments of the invention is shown in part in cross-section and partially schematically in FIG. 1.

This figure is a cross-section taken through a single cylinder of an engine which operates on a two-cycle crankcase compression principal. Although the invention is described in conjunction with a single cylinder, it is believed that the following description will enable those skilled in the art to understand how the invention is practiced in conjunction with engines having multiple numbers of cylinders and arranged in any desired configuration.

Also, although the invention is described in conjunction with a two-cycle engine, certain facets of the invention can be utilized in conjunction with four-cycle engines. The invention, however, has particular utility in conjunction with two-cycle engines because of the fact that there is substantial overlap between the opening of the scavenge port and the exhaust port and these present the problem of fuel escape during these conditions, particularly when direct cylinder injection is employed.

In addition, the fact that there is little time between the injection of fuel and the firing in a two-cycle direct injected engine, certain features of the invention had particular utility in conjunction with these extreme running conditions. However, and as will be apparent to those skilled in the art, the advantages of the invention can also be enjoyed with four cycle engines.

The engine 21 is comprised of a cylinder block, indicated generally by the reference numeral 22, in which one or more cylinder bores 23 are formed. The axis of the cylinder bore 23 is indicated at Ca. One end of the cylinder bore 23 is closed by a cylinder head assembly 24 that is detachably affixed to the cylinder block 22 in a known manner. The other end of the cylinder bore 23 is closed by a crankcase member 25 which is also affixed to the cylinder block 22 in a suitable manner. Along with a skirt 26 of the cylinder block 22 this crankcase member 25 forms a crankcase assembly, indicated generally by the reference numeral 27, which defines a crankcase chamber 28.

A piston 29 is supported for reciprocation within the cylinder bore 23. This piston 29 is connected by means of a piston pin 31 to the small end of a connecting rod 32. The other or big end of the connecting rod 32 is journaled on the throw 33 of a crankshaft, indicated generally by the reference numeral 34. The crankshaft 34 is rotatably journaled in a suitable manner in the crankcase chamber 28 for rotation about a rotational axis, indicated by the reference point 35.

The piston 29 has a head 36 which cooperates with a recess 37 formed in the lower surface of the cylinder head 24 and the cylinder bore 23 to form a variable volume combustion chamber. FIG. 1 shows the piston 36 at its bottom dead center position when the combustion chamber, indicated generally by the reference numeral 38, is at its maximum volume. When the piston 23 is at its top dead center position, the cylinder head recess 37 forms a substantial portion of the combustion chamber volume.

As is typical in two cycle, crankcase compression, engine practice, the crankshaft 34 and its relationship with the crankcase member 28 is sealed so that the crankcase chamber 28 associated with each cylinder bore 23 is sealed.

An air charge is delivered to this crankcase chamber 28 by means of an induction system, indicated generally by the reference numeral 39. This induction system includes air inlet device which is not shown but which delivers as shown by the arrow 41 to a throttle body 42. A throttle valve (not shown) is positioned in this throttle body 42 and controls the speed of the engine 21 by controlling the amount of air flowing to it.

The throttle body 42 communicates with an intake manifold, which is shown partially in phantom and which is indicated by the reference numeral 43. This intake manifold 43 communicates with an intake port 44 formed in the crankcase member 25 and which communicates directly with the crankcase chamber 28.

As is typical with two-cycle engines, a reed-type check valve 45 is positioned in the intake port 44 so that the air flow charge can flow into the crankcase chamber 28 as indicated by the arrow 46 when the piston 29 is moving from the illustrated bottom dead center position toward a top dead center position. However, after the piston 29 reaches its top dead center position and begins to move downwardly, the charge in the crankcase chamber 28 will become compressed. At this time, the reed-type check valve 45 will close to preclude escape of the charge which is being compressed.

The charge which is compressed in the crankcase chamber 28 will then be transferred to the combustion chamber 38 through a scavenging system. This scavenging system is shown also in FIG. 2 and comprises a pair of main Schnurle scavenge passages 46 each of which terminate in a respective scavenge port 47 formed on diametrically opposite sides of the cylinder bore axis, indicated at Ca. In addition, an auxiliary scavenge passage 48 is formed between the main scavenge passages 46 and terminates in an auxiliary scavenge port 49.

The thus transferred charge is compressed during the continued assent of the piston 29 in the cylinder bore 23.

Figure 2:
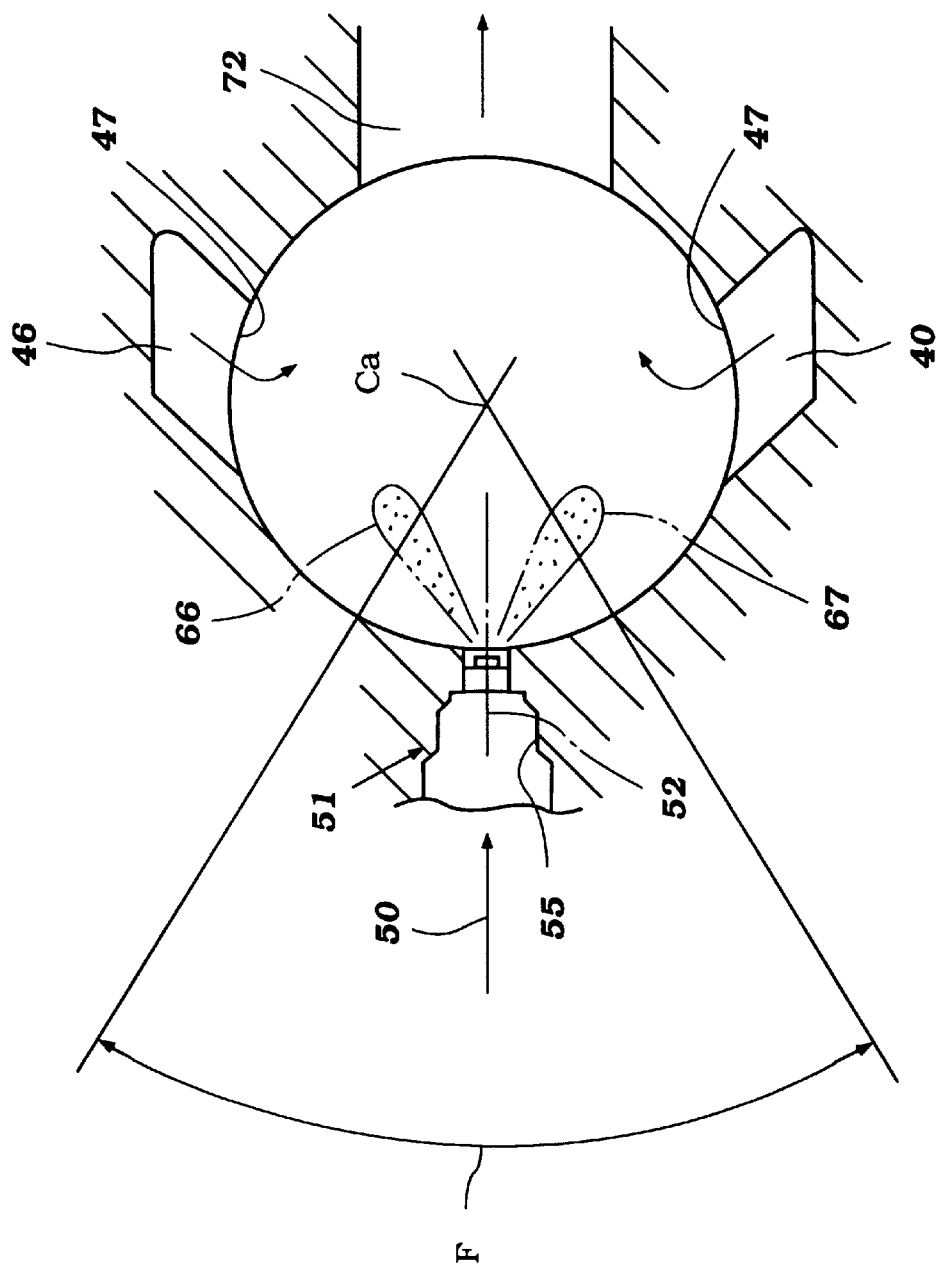
FIG. 2 is a cross-sectional view taken along the line 2—2 of FIG. 1 and shows the fuel injection spray pattern and possible injector locations.

A fuel injector, indicated generally by the reference numeral 51 is mounted in a side of the cylinder block 22. The fuel injector 51 is mounted so that its longitudinal axis, indicated at 52 in FIG. 2 is somewhere within the angular range indicated at F in this Figure which is disposed between the main scavenge ports 47 and within an angle that is about 30°. This specific position is done so as to minimize the likelihood that injected fuel will be discharged through the exhaust port, to be described, before it has a chance to burn.

The fuel injector 51 is of any known type and preferably is of the solenoid operated type. A controller 53 is provided for controlling the delivery of an electrical charge to the solenoid valve so as to control the discharge of fuel from the injector. Fuel is supplied to the injector by a suitable fuel supply system which may include a fuel rail that is connected to the injector 51. The fuel is injected into the combustion chamber 38 at a preferred pressure of 10 kg/cm². The direction of fuel supply is indicated by the reference numeral 50. Those skilled in the art will readily understand how any known type of fuel supply system can be employed in conjunction with the injector 51.

Figure 3:
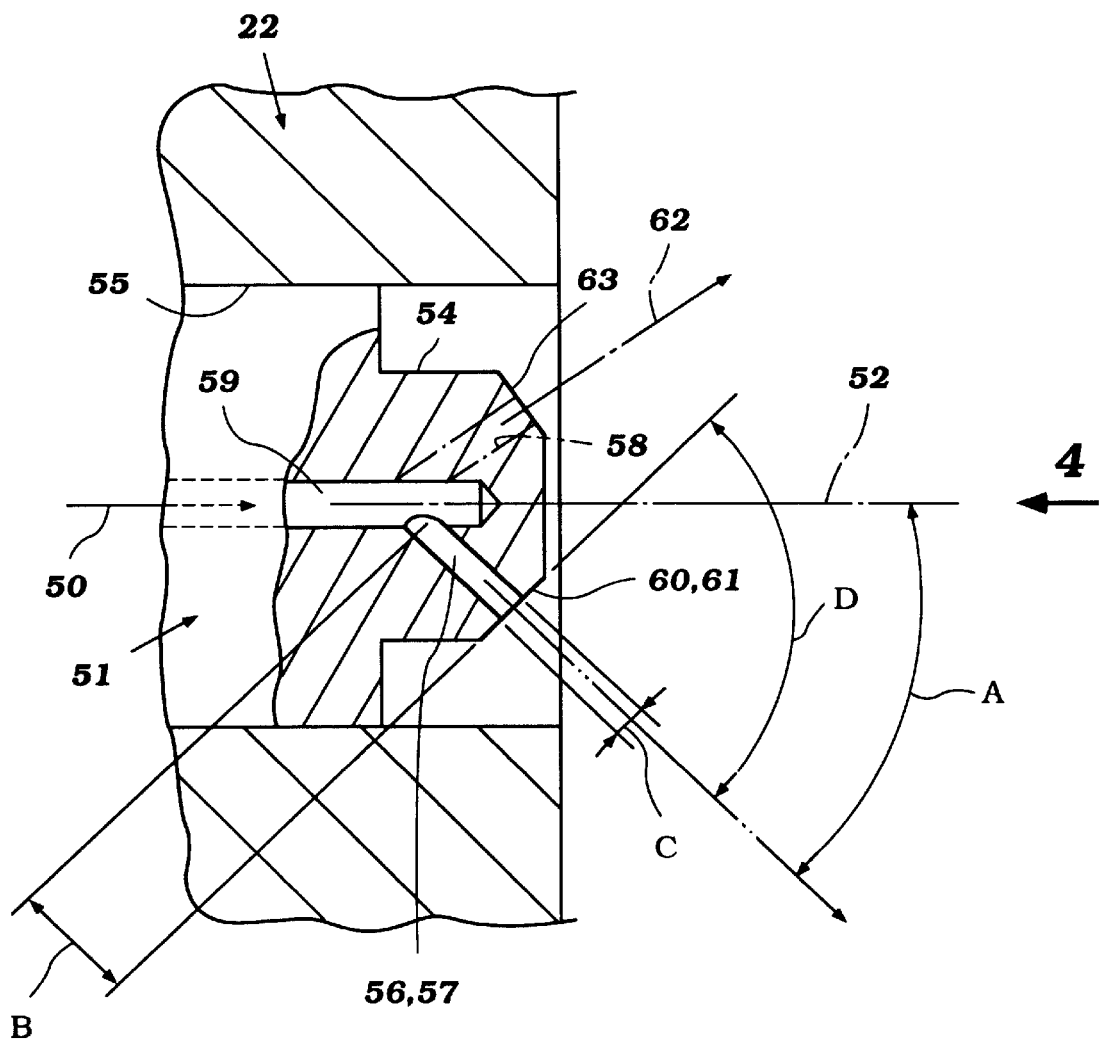
FIG. 3 is an enlarged cross-sectional view taken along the same plane as FIG. 1 but shows the fuel injection nozzle and its relationship to the cylinder bore.
Figure 4:
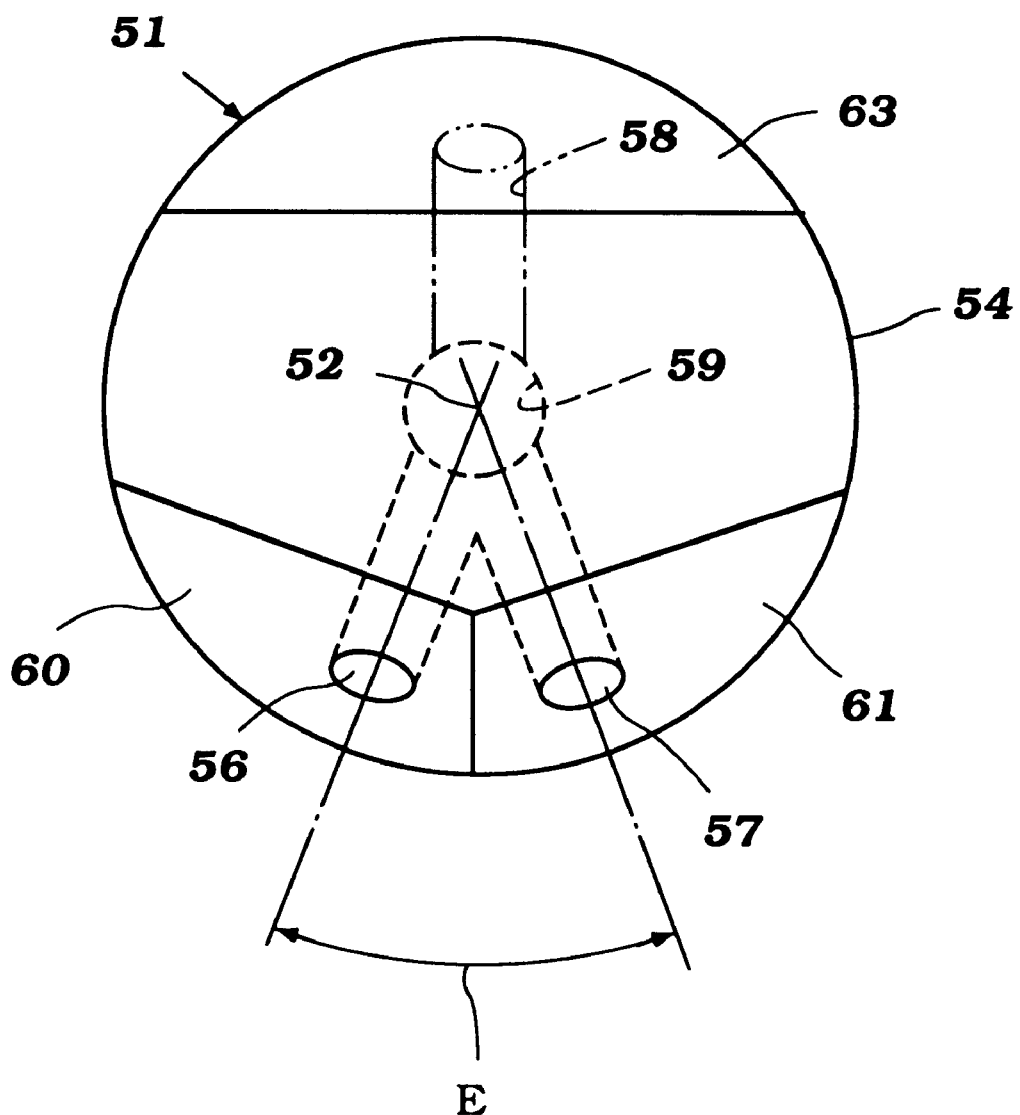
FIG. 4 is an enlarged end elevational view of the fuel injector nozzle looking in the direction of the arrow 4 in FIG. 3.

As best seen in FIGS. 3 and 4, the injector 51 has a discharge nozzle portion, indicated by the reference numeral 54 that is received in a bore 55 formed in the cylinder bore 22 within the aforenoted angular range F and preferably above the auxiliary scavenge port 49.

The fuel injector 51 is mounted so that its nozzle tip portion 54 is recessed slightly within the bore 55 so that it will be free of contact with the piston 29 and piston range during reciprocation of the piston. It will be seen that the axial position is such that the injector nozzle 54 is shielded by the piston during a portion of the piston stroke. Preferably, this location is such that the injector nozzle portion 54 will be obscured when the piston 29 moves to within 50–60° before top dead center position and is again opened when the piston 29 descends in the bore 23 to 50–60° after top dead center position. This means that the injector nozzle 54 is exposed for something in the range of 240–260 degrees of crankshaft rotation which is adequate for even maximum power output.

This also permits injection to be done at relatively low pressures and into an area where the pressure is low and when the temperature is still relatively, something in the range of 180° C. However, this also means that there may be some difficulties in achieving full fuel vaporization. This is compensated for by the ignition control strategy, to be described.

The spray from the injector nozzle tip 54 is directed by three discharge ports comprised of two downwardly facing discharge ports 56 and 57 and one upwardly facing discharge port 58. These discharge ports 56–58 receive fuel that is delivered through a discharge passage 59 from the injector valve. The discharge ports 56 and 57 are formed in faces 60 and 61 of the nozzle tip which faces are generally downwardly facing. The nozzle ports 56 and 57 are disposed at an angle in the range of 40–70° from the injector axis 52 which is perpendicular to the cylinder bore axis Ca. This angle is indicated at A in FIG. 3. These nozzle ports 59 and 61 are formed generally perpendicularly to the faces 60 and 61 this angle being shown at D in FIG. 3.

The angle between the nozzle ports 56 and 57 is indicated at E in FIG. 4 and is in the range of 35–55°. These angular relationships are chosen so as to ensure maximum fuel dispersion without having the fuel being swept out of the exhaust port, yet to be described, during the injection cycle and when the exhaust port is open.

The remaining injector port 58 has its spray axis 62 directed in an upward direction so as to spray toward the cylinder head recess 37. This nozzle port 58 opens through an incline face 63 also formed on the end of the nozzle tip 54.

Finally, the diameter C of the nozzle ports 56–58 is preferably something less than 0.5 mm so as to ensure to a fine spray mist.

As may be seen in FIG. 1, the nozzle ports 56 and 57 direct a first and second spray paths 65 and 66 respectively which are directed downwardly toward the head 36 of the piston 23. The spray from the remaining nozzle port 58 is upwardly and toward the cylinder head recess 37, as indicated at 67 in FIG. 1.

Referring again now primarily to FIG. 1, a spark plug 68 is mounted in the cylinder head assembly 24 so that its spark gap 69 is positioned closely adjacent to the cylinder bore axis Ca. This also in the path of the fuel spray 67 from the nozzle injector port 58. This spark plug 68 is fired by an ignition system that is controlled by the ECU 53 in accordance with any one of the strategies which will be described shortly.

The charge which is ignited by the spark plug 68 and specifically by the spark jumping the gap 69 will burn and expand to drive the piston 29 downwardly in the cylinder bore 23 as is well known in this art. During this downward movement and at a point before the scavenge ports 47 and 49 open, an exhaust port 71 will open.

The exhaust port 71 is positioned diametrically opposite to the auxiliary scavenge port 49 and between the main scavenge ports 47. This port 71 communicates with an exhaust passage 72 that is formed in the cylinder block 22. An exhaust manifold 73 is affixed to the cylinder block 22 and collects the exhaust gases which are flowing in a direction indicated by the arrow 74.

An exhaust control valve 75 may be provided in the cylinder block 22 in proximity to the exhaust port 71 so as to change the timing and duration of its opening. This exhaust control valve may be operated with any desired or known strategy. The ECU 53 may also execute the control strategy for the exhaust control valve 75. However, the important feature in connection with the invention deals with its control of the firing of the spark plug 68, as has been previously noted.

For its control purpose and specifically dealing with the firing of the spark plug 68, certain sensors are provided that sense varying engine and ambient conditions. Some of these will be indicated, although it will be apparent to those skilled in the art how additional features can be employed so as to affect the control. These sensors are shown in FIG. 1 in connection with the engine and in FIG. 5 in connection with the ECU 53. They will be described now.

First, there is provided a crank angle sensor 76 that is associated with the crankshaft 34 and which senses its angular rotation. By comparing this with time, it is possible to obtain a speed signal of the speed of rotation of the crankshaft 34 as well as instantaneous position.

The operator demand or load on the engine 21 is determined by a throttle position sensor 77 which is associated with the throttle body 42 and specifically the throttle valve therein. As is well known, potentiometers are frequently used for this purpose and such a device may be employed to provide the throttle position signal.

The engine control strategy preferably employs a feedback control for maintaining the desired air fuel ratio. Thus, the engine is provided with a combustion condition sensor such as an oxygen ($O_2$) sensor 78 that is provided in the cylinder head exhaust passage 72. Typically, the oxygen sensors indicate air fuel ratio by checking the amount of residual oxygen in the burnt charge.

One feature that is important in connection with the invention is controlling the firing of the spark plug 68 under conditions when fuel vaporization may not be good One of these conditions is low pressure in the combustion chamber and, therefore, there is provided a combustion chamber pressure sensor 79 which is mounted in the cylinder head assembly 24 and which extends into its recess 37.

Figure 5:
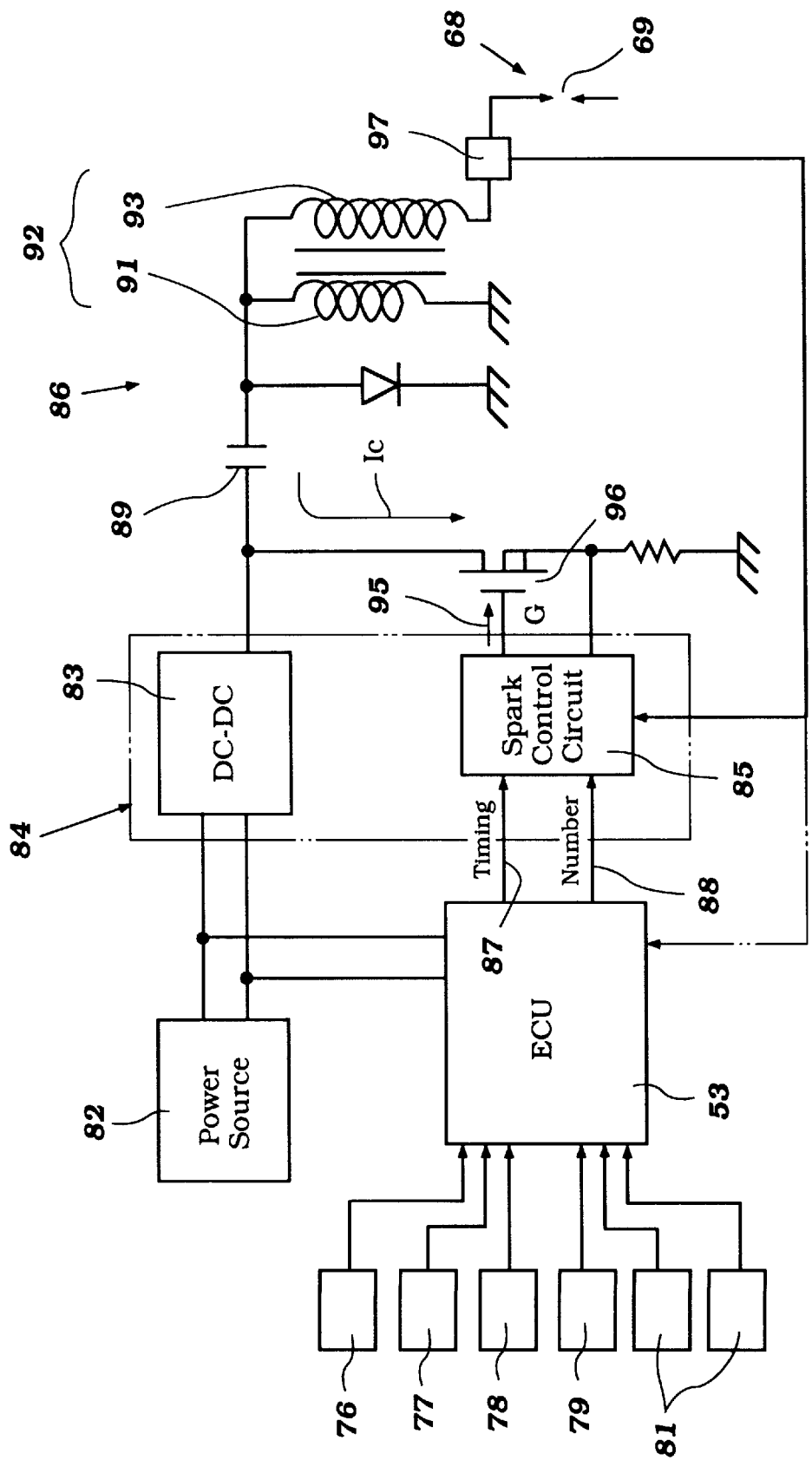
FIG. 5 is a partially schematic view showing an embodiment of ignition system for firing the spark plug of the engine.

In addition to the sensor specifically mentioned and as already mentioned, various other conditions can be sensed of either the engine operation and/or ambient conditions and such additional sensors are shown at 81 in FIG. 5.

Referring now specifically to FIG. 5, the circuitry for firing the spark plug 69 is illustrated. This system includes a source of electrical power 82 which may be a magneto generator, a storage battery or the like that outputs power for operating both the ECU 53 and a DC converter 83 of a control module 84.

In accordance with the invention, the ECU 53 outputs two types of control signals to a spark control circuit 85 which fires an ignition system such as a capacitor discharge type ignition system, indicated at 86 and which will be described in more detail shortly. The two types of control signals transmitted by the ECU 53 to the spark control 85 are a timing control, indicated at 86 and a control signal 87 for effecting multiple firings under certain conditions as will be described and in numbers to be arrived at also in a manner to be described.

The output from the converter circuit 83 is used to charge a capacitor 89 of the CDI ignition circuit 86. The capacitor 89 is in circuit with a primary winding 91 of an ignition coil, indicated generally by the reference numeral 92. The secondary winding 93 of this ignition coil is in circuit with the spark plug 68 for firing it. A diode 94 is interposed between the capacitor 89 and the primary winding 91.

The spark controlling circuit 85 outputs a switching signal 94 to the gate G of an electronic switching element 96. When the switching element 96 is switched on, the charged capacitor is discharged to ground as indicated by the arrow IC in this figure. When this occurs, a voltage will be induced in the primary winding 91 which is stepped up to the secondary winding 93 and affects firing of the spark plug 68 in a well known manner.

Finally, there is provided in the circuit between the secondary winding 93 and the spark plug 69 a voltage sensor 97 which outputs a signal back to the ECU 53 for a purpose which will become apparent shortly.

The system operates so that the ECU 53 will output a timing signal, the signal 87 afore-referred to, as to when ignition is to begin. This timing signal will be determined by the engine running characteristics in accordance with any desired control strategy. However, this strategy also provides that under some running conditions, when stable combustion may not be easily obtained, to output signals through the output 87 to achieve multiple firings of the spark plug.

When the spark plug is multiply fired, the timing may be slightly advanced, although this is not essential. Also, and as will be described, the numbers of firings will depend upon certain running conditions.

Figure 6:
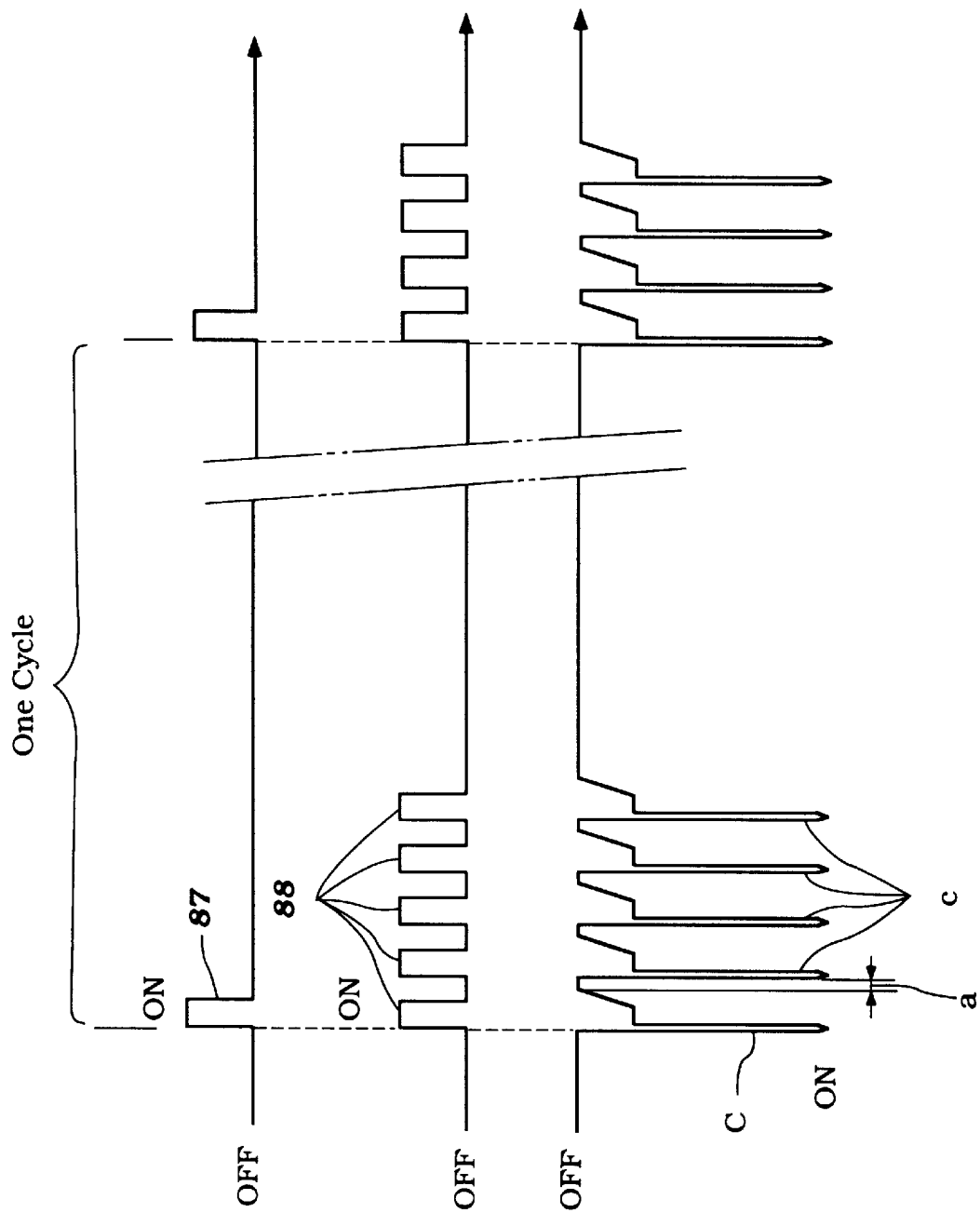
FIG. 6 is a graphical view showing the timing of spark firing, the number of sparking signals transmitted and the electrical voltage at the spark gap in this embodiment.

FIG. 6 is a graphical view showing the spark control signals and specifically the signals 87 and 88 as well as showing the condition of the voltage across the spark plug which is measured by the detector 97. Thus, progressing with a single revolution, the timing output signal 87 will be initiated and the first firing of the spark plug begun at this time. This will result in discharge of the capacitor 89 and the induction of a high voltage as aforenoted for firing the spark plug. This initial spark firing pulse is shown in the lower curve of FIG. 6.

If successive firings occur, at a frequency to be determined in the manner described, then the firing will repeat as shown by the following voltage curve C. The time for charging and discharging the capacitor and firing the plug takes approximately $200\mu$ seconds. There is time delayed d between the first firing and the initiation of any subsequent firing and this time is kept fairly short something in the manner of $100\mu$ seconds.

The strategy and manner in which the number of multiple firings occurs and the conditions in which multiple firing is done will now be described by particular reference to FIGS. 7–9. Before referring specifically to these figures, however, it is again stated that the multiple firing is done under conditions when there is a likelihood of incomplete combustion with only a single firing. This normally occurs under conditions when there is relatively low pressure and low temperature in the combustion chamber and/or the other running conditions are such that the fuel may not fully vaporize. These conditions may be low engine speed or load low pressure in the combustion chamber or low temperature at the time of firing of the spark plug. Other conditions will be described later.

Thus, in accordance with the invention the number of firings under these conditions is determined by reading two maps, one a three dimensional map indicating the number of firings required by the engine speed and load, and the other a condition determined by the air fuel ratio. If the air fuel ratio is in the range of stoichiometric, then additional firings may not be required. However, if the mixture is either leaner or richer than a mixture within the range of stoichiometric then multiple firings will be required.

Figure 7:
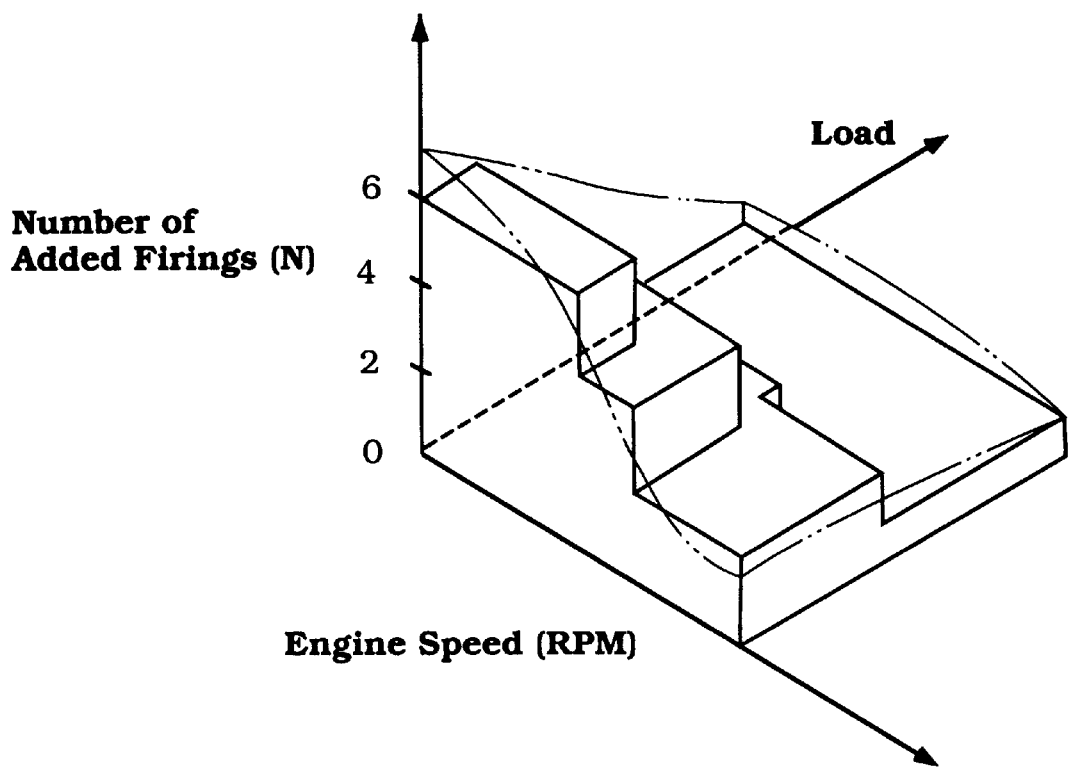
FIG. 7 is a graphical three-dimensional map showing the number of spark firings based upon engine speed and engine load in accordance with the control routine.

Shown in FIG. 7 is a three-dimensional map as may be seen when the engine speed is low and/or the engine load is low a higher number of firings is required. As the speed and/or load increase, a reduced number of firings is possible and only a single firing may be accomplished. If the value from the map of FIG. 3 is zero, then only a single firing of the spark plug will occur.

Figure 8:
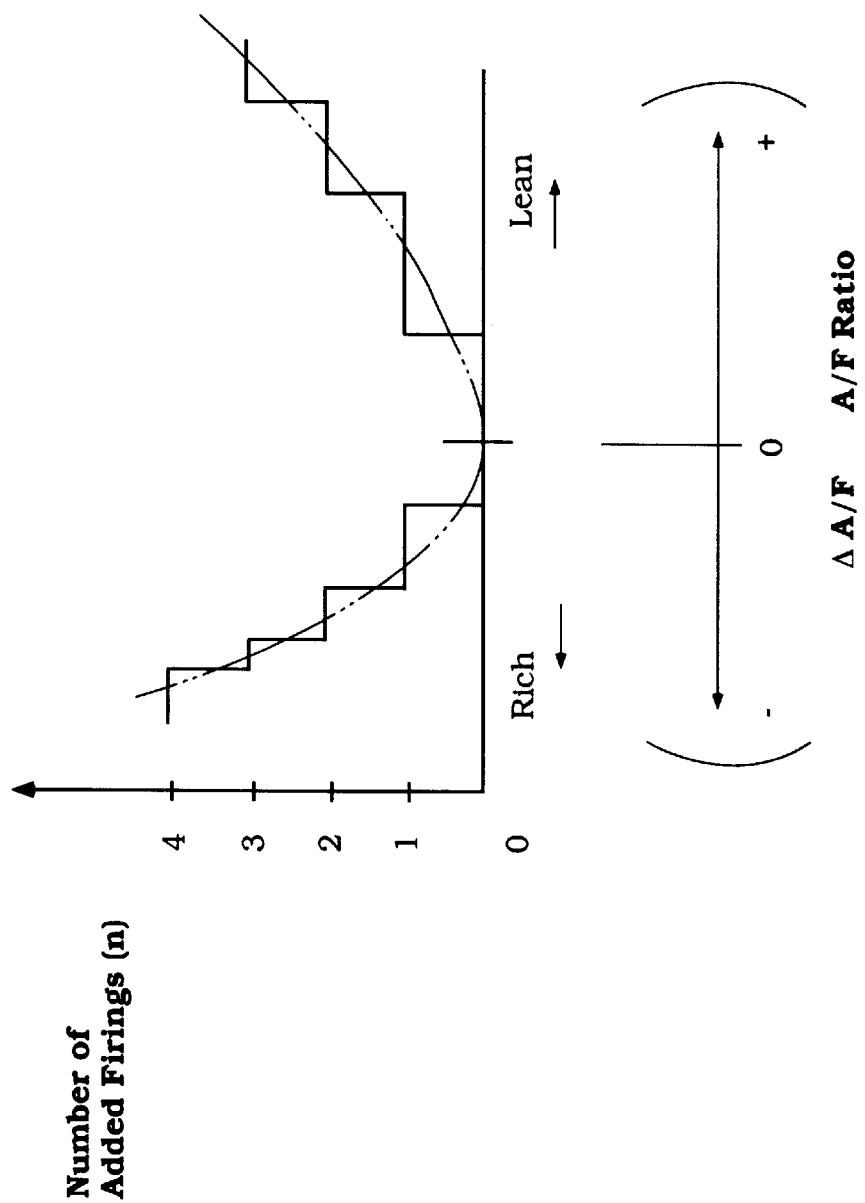
FIG. 8 is a graphical map showing the number of spark firings in relation to air fuel ratio in accordance with this control routine.

FIG. 8 is map showing how the air fuel ratio also determines the number of firings. As seen, if the engine is running at the stoichiometric air fuel ratio are within a range on the rich and lean side of it then no additional firings are required. However, as the deviation becomes greater, then a greater number of firings is required.

Thus, by taking the results of the maps from FIGS. 7 and 8 and adding them to the normal firing, it is possible to obtain the information by which the number of firings will be accomplished. This follows the control routine shown in FIG. 9 and which will now be described by reference to that figure.

The control routine starts at the step S1 and then moves to the step S2 to read the engine speed and load from the detectors 76 and 77 or from other suitable indicators of these conditions. The program then moves to the step S3 so as to the read from the map, for example a map such as that of FIG. 7, the number of additional firings (N) required for the given engine speed and load. As has been previously noted, under some conditions this value may be zero.

The program then moves to the step S4 to read the air fuel ratio from the output of the oxygen sensor 78 and to determine the change in air fuel ratio or deviation from the desired stoichiometric air fuel ratio. This is done then at the step S5. The program consults the map of FIG. 8 to determine the number of added firings (n) for the air fuel ratio.

The program them moves to the step S6 so as to calculate the total number of spark plug firings F which is equal to the value of N plus n.

$$F=N+n$$

The program then moves to the step S7 so as to fire the spark plug this number of times. As has been previously noted, this firing is accomplished by the output signals 87 and 88 from the ECU to the controller 85 (FIG. 5).

The program then ends at the S8 or repeats. However as will now be discussed, other controls to achieve more stable running may performed in addition to the described strategy.

Another engine condition where it may be desirable to achieve multiple spark plug firings to improve combustion is if the engine speed varies during what would otherwise be steady state running conditions. That is, if the engine is running at a certain speed and that speed is being held but the actual speed varies then multiple firings may be desirable to stabilize engine speed. Next will be described an embodiment where that is accomplished.

Figure 10:
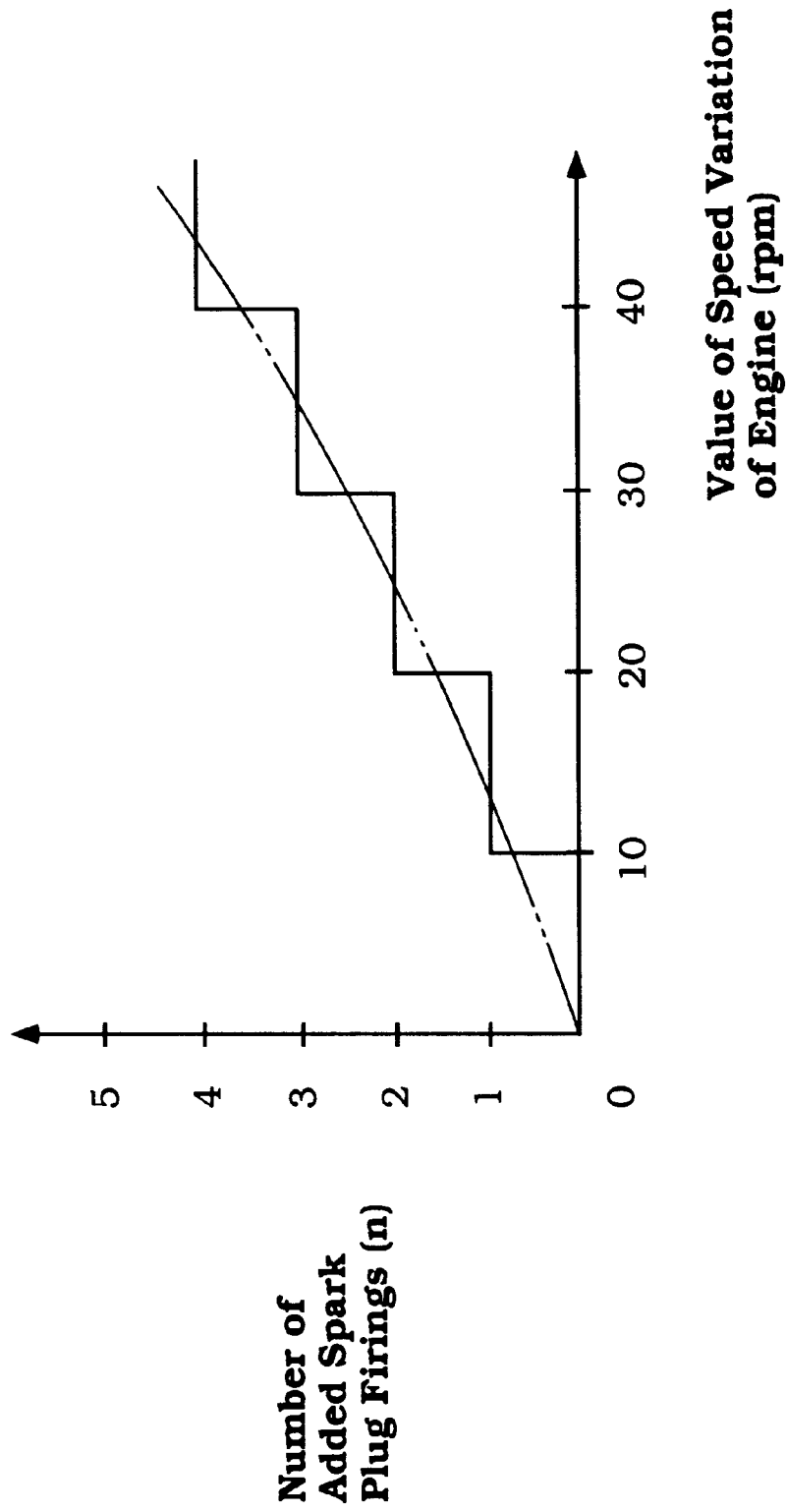
FIG. 10 is a graphical view showing a map of the number of spark firings to correct a conditions of varying engine speed.

Referring first to FIG. 10, this is a map that shows how the variation in engine speed can call for an increased number of firings. As shown in this map, the greater the variation in engine speed, the greater the number of firings required in order to bring the speed back into the desired speed.

Figure 11:
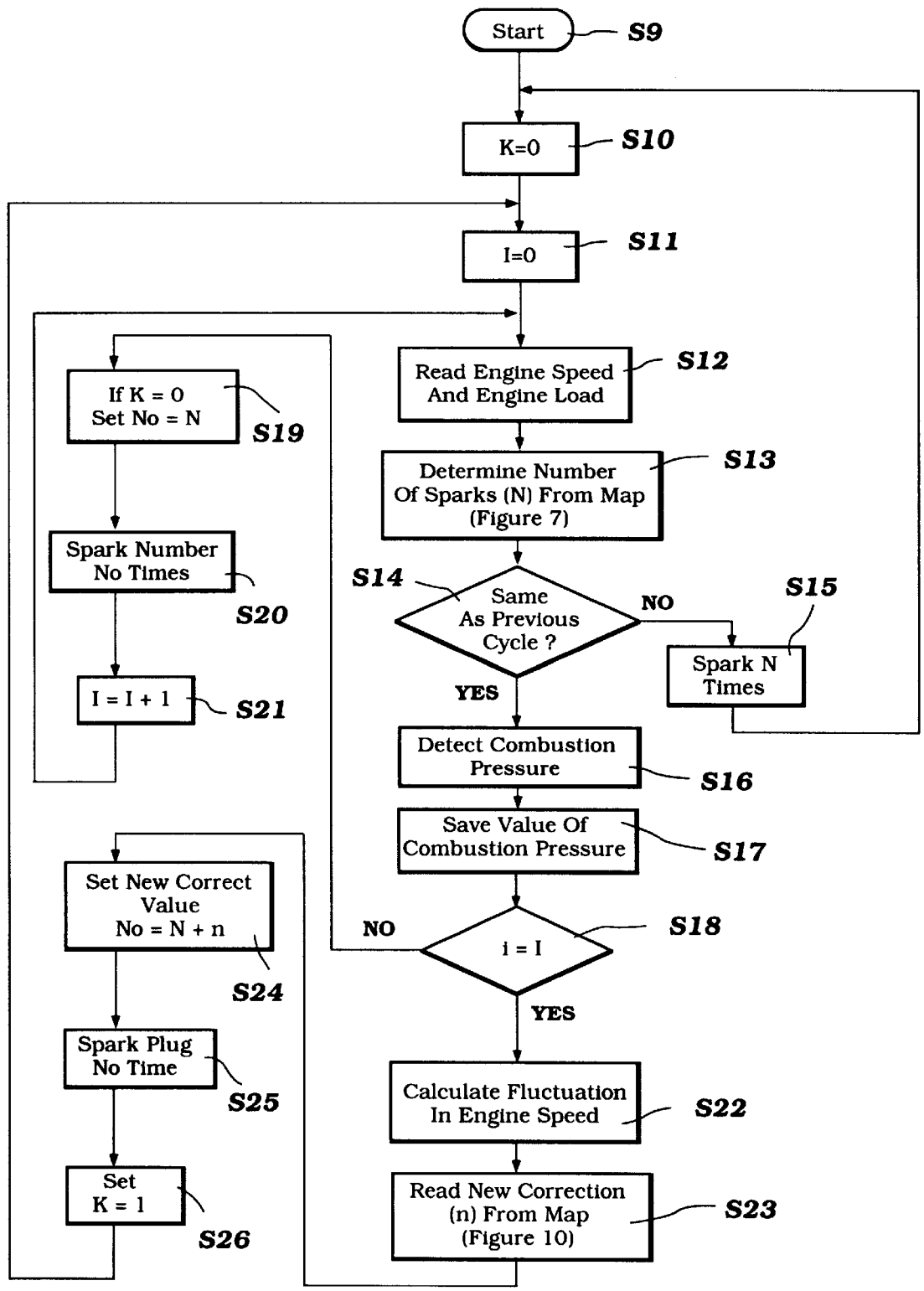
FIG. 11 is a block diagram showing the control routine for determining the number of spark firings under conditions of correction for varying engine speeds.

The control routine by which this is done is seen in FIG. 11 and will be described by reference to that figure. First, however, it is to be understood that this engine speed adjustment modification is only made when the engine is found to be running in a continuous or stable condition. Therefore, the program starts at the step S9, which is run at the completion of the previous cycle shown in FIG. 9. The program then moves to the step S10 to set a counter K at zero. This counter is based upon the number of times that a compensation figure is read, as will be described below.

The program then moves to the step S11 so as to set a further counter I at a value equal to zero. The program then moves to the step S12 to again read engine speed and engine load in the manner previously described in conjunction with step S2 of FIG. 9.

The program then moves to the step S13 so as to determine the number of sparks and from the map of FIG. 7 dependent upon engine speed and load. This has also been described previously.

The program then moves to the step S14 to determine if the value N is the same as that of the previous cycle. This is done, as aforenoted, to determine if the engine is intended to be running in a stable speed state.

If at the step S14 the response is "no", the program moves to the step S15 to set the new value of N as determined at step S13 and the program then repeats. The sparking will then be done in accordance with the value determined via the methodology of FIG. 9.

If, however, at the step S14 it is determined that the value N is the same from the previous cycle, then it is determined that the engine is running in a relatively stable speed state and the program moves on to determine if fluctuations are occurring.

At the step S16, the combustion pressure is sensed by reading the output of the pressure sensor 79 at an appropriate time after the spark plug has been fired. This is done in accordance with a control routine where variations are based upon combustion pressure rather than variations in engine speed. That is, this is done for another routine than the one specifically shown in FIG. 11.

The program then moves to the step S17 to memorize or retain the value of the combustion pressure in a memory. The program then moves to the step S18 to determine if the value I is equal to a value "i" this latter number being the number of predetermined cycles during which variations are determined.

If at the step S18 it is determined that the value I is not equal to the value i, then the program moves to the step S19.

At the step S19, if the value of K is still equal to 0 then the new value No is set to the previous N.

Figure 9:
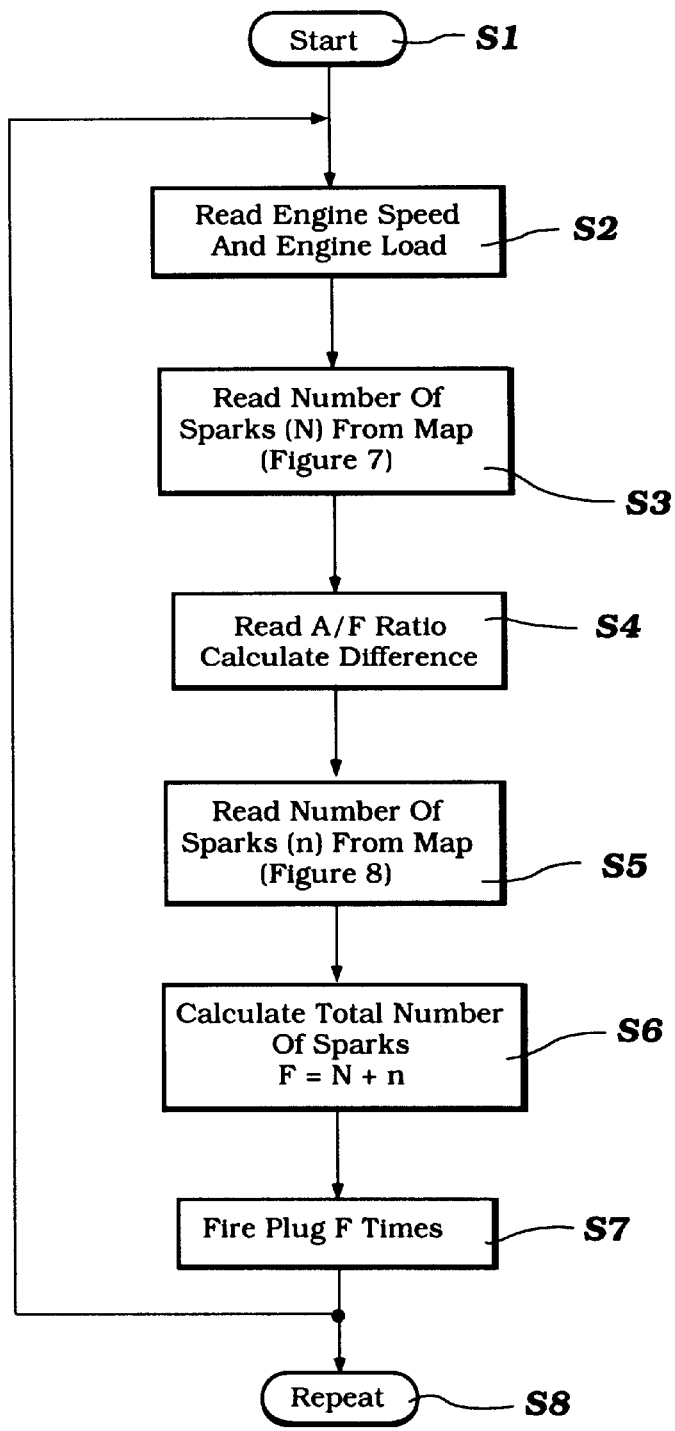
FIG. 9 is a block diagram showing the control routine for determining the number of spark firings.

The program then moves to the step S20 so as to fire the spark plug the number of times No again referring back to the routine of FIG. 9.

The program then moves to the step S21 to reset the counter I by 1 i.e., I=I+1 and the program repeats to the step S12.

If at the step S18 it is determined that the value of i=I then the program moves to the step S22 so as to calculate the fluctuation in engine speed. In other words, if the time period I has elapsed then a new speed reading has taken.

It should be noted that the value N calculated at the step S13 is based from a map and thus, even though the value N may be the same as a previous cycle, the speed may have varied. In other words, the value of N is set over a range and it is determined both by speed and load.

Thus, at the step S22 the fluctuation in engine speed as calculated by comparing the previous speed with the speed at this new time. This obtains a variation value for use in the map of FIG. 10.

The program then moves to the step S23 to read a new corrected value for the number spark firings n determined from the speed variation.

The program then moves to the step S24 so as to set a new corrected value for N based upon the previous value of N plus the corrected value n in accordance with:

$$No=N+n.$$

The program then moves to the step S25 so as to spark the spark plug this new number of times. Again, this value is taken back into the routine of FIG. 9 and utilize there to determine the actual total number of sparks. The program then moves to the step S26 so as to set the counter K up to 1 and the program then repeats to the step S11.

In the embodiment as thus far described, there has been multiple firings of the spark plug under some demanding running condition. Rather than employing multiple firing, it is also possible to provide an extended firing of the spark plug over a time interval. This may be done either at a constant spark intensity or by a spark intensity that changes its energy and which has peak and non-peak periods.

With a capacitor discharge ignition system, the capacitor is discharged and there is a time when the spark voltage reaches a peak and then falls to zero as shown in FIG. 6. However, there may be another type of plug firing wherein there is an initial high voltage firing and then subsequently and for a longer time period, there is a lower level spark voltage applied that will still act to assist in initiating combustion. This is accomplished by preventing the capacitor 89 from becoming fully discharged. In the just described embodiment the time interval d was such that the capacitor 89 would fully discharge and then fully charge to provide successive high intensity sparks.

Figure 12:
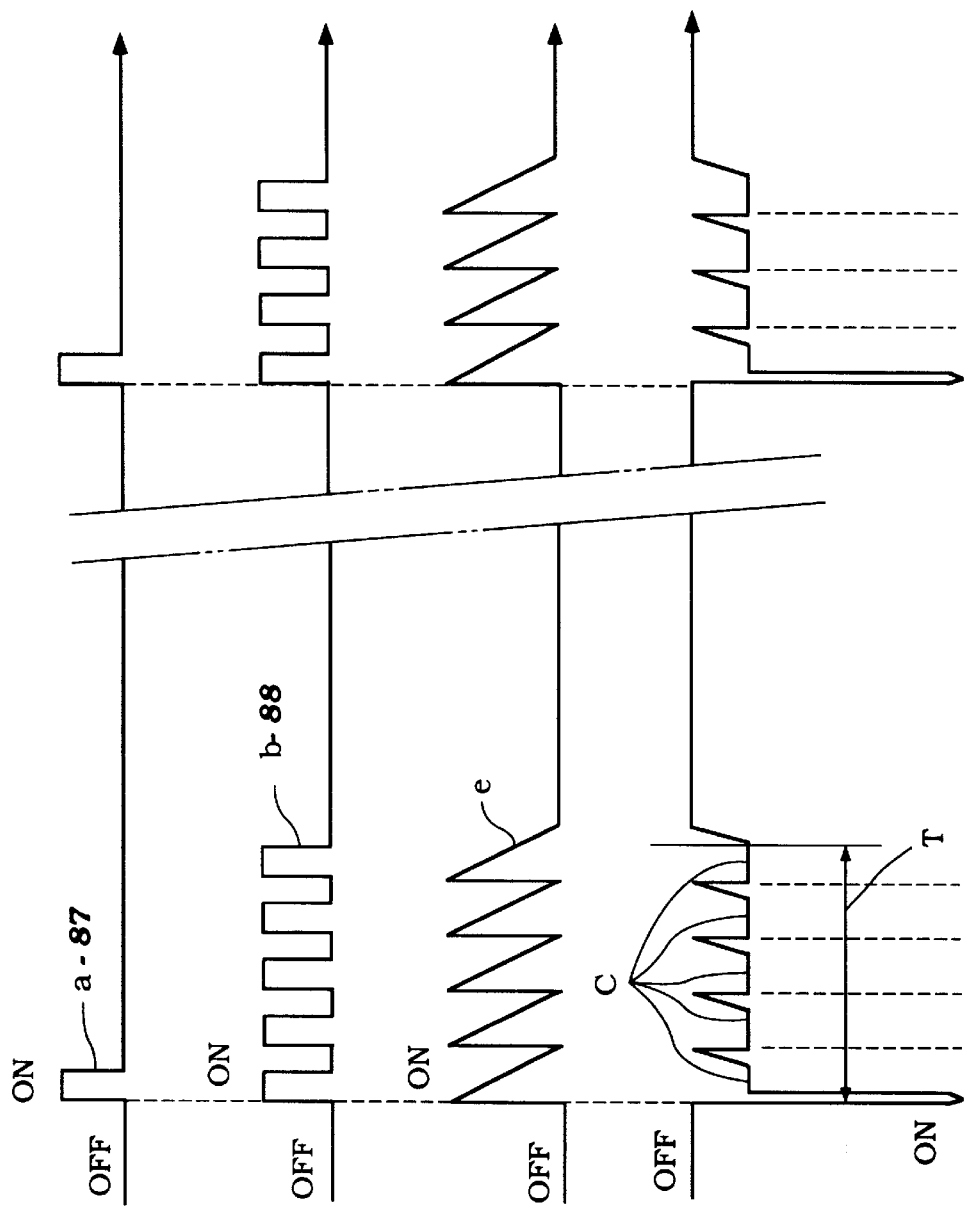
FIG. 12 is a graphical view showing ignition timing impulses, multiple spark firing signals, and other factors in accordance with another feature of the invention.

Another arrangement is shown in FIG. 12 that continues the spark, but at a lower intensity after the initial firing. The top two graphs of this figure show the output signals 87 and 88 during a firing condition when the timing and multiple firing is employed. The third figure shows the output signal from the voltage sensor 97. This output signal is indicated at e.

The operation of the secondary coil and the spark plug, which operates like a capacitor, causes a breakdown in the voltage and the voltage falls as shown but is prevented from going to 0 by again initiation another firing signal 88 before this occurs. Thus the voltage then rises again but to a lower level because of the status of the capacitor 89. Thus, for the time period T, there is a low level spark voltage which does assist in the continued combustion.

Figure 13:
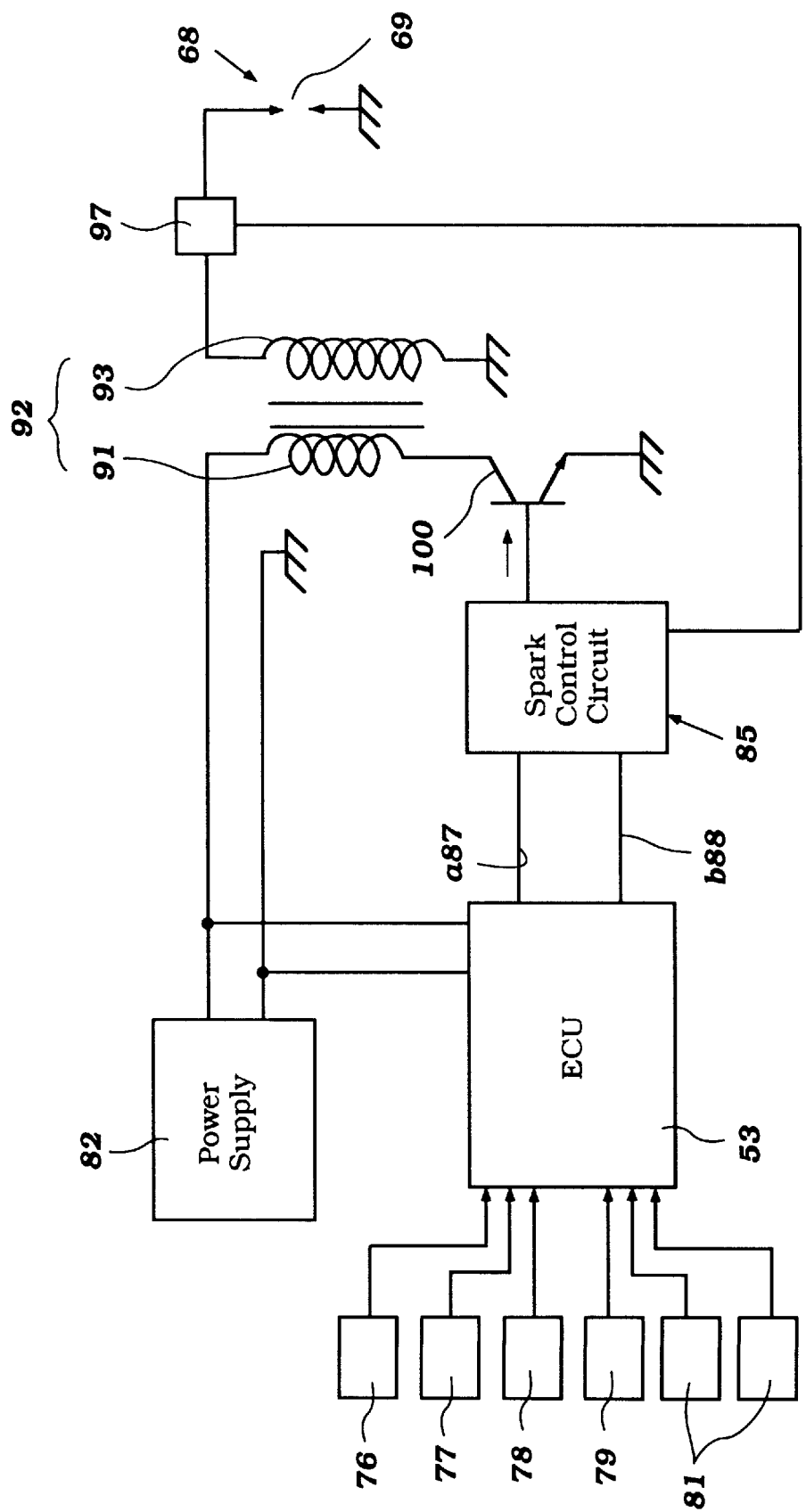
FIG. 13 is a block diagram, in part similar to FIG. 5 show another embodiment of ignition circuit.
Figure 14:
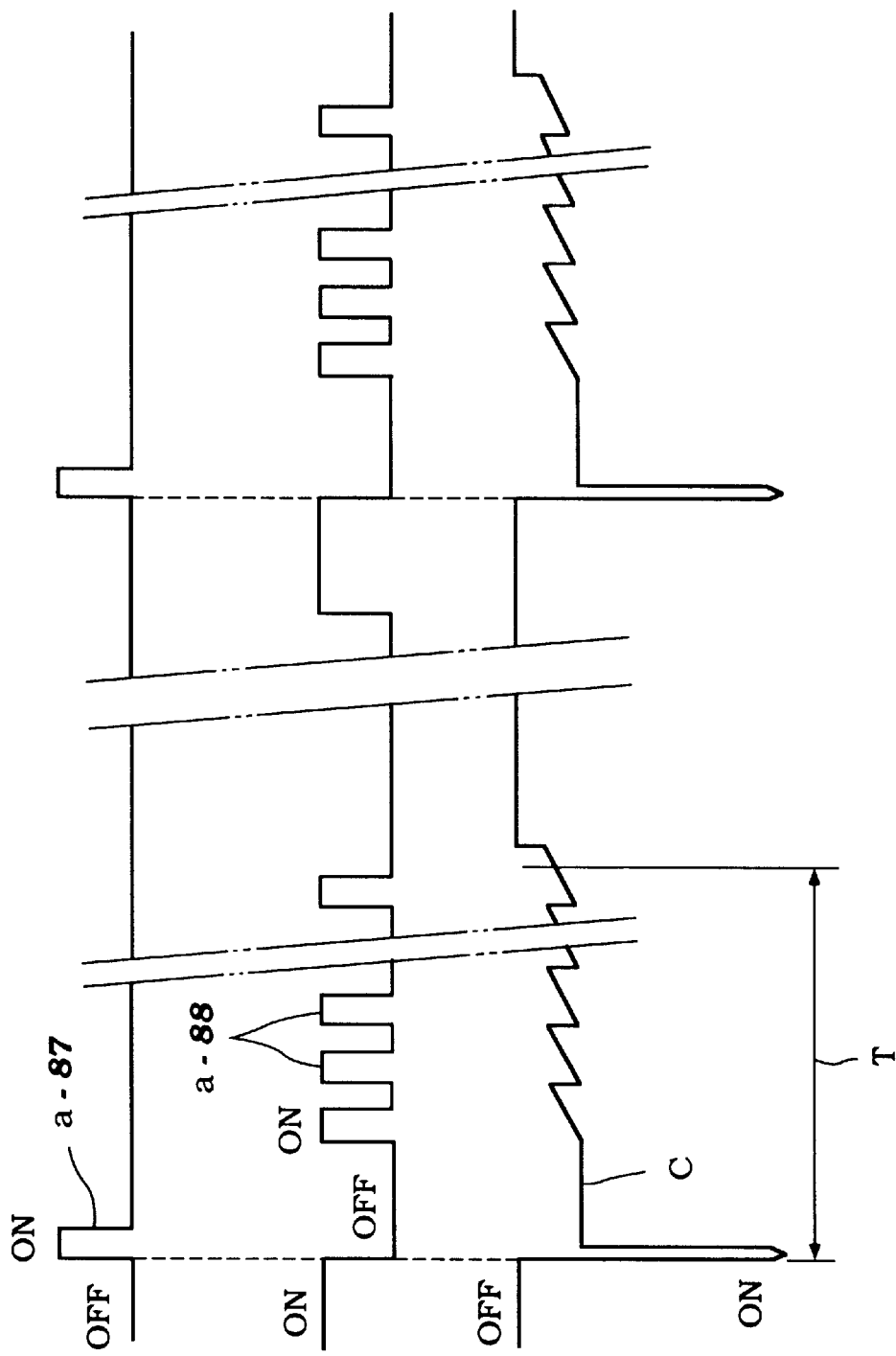
FIG. 14 is a graphical view showing the spark timing outputs in connection with the embodiment of FIG. 13.

FIG. 13 shows another embodiment of the circuit for firing the spark plugs which differs from the previously described embodiment in that it eliminates the capacitor discharge system and rather uses an electronic switching element 100 for controlling the flow of current through the primary winding 91 of the coil 92. By appropriately switching the switching device 100, then it is possible to obtain a lower voltage current flow across the spark gap as shown in FIG. 14 which will also provide a lower level voltage but longer duration so as to assist in combustion.

In the embodiments of the invention as thus far described, the fuel injector 51 has been placed in the cylinder block 22 and was shrouded by the piston 29 during a portion of its stroke. As has been previously alluded to, this is advantageous in that it protects the fuel injector from the pressure and temperature at the beginning of combustion. However, it also reduces the time in which fuel is available to be injected and thus requires somewhat higher injection pressures.

Figure 15:
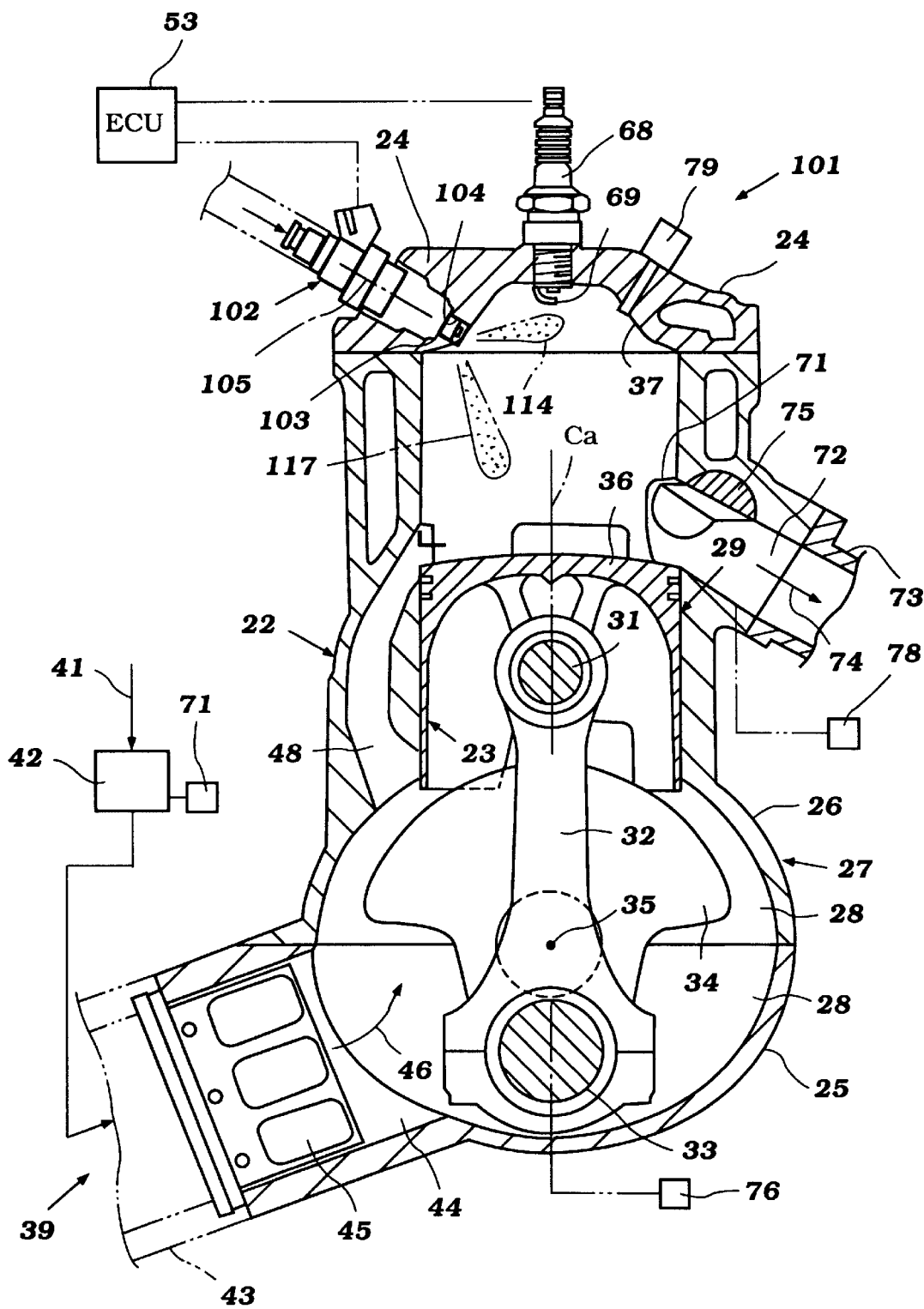
FIG. 15 is a cross-sectional view, in part similar to FIG. 1, and illustrates another engine construction that can practice the various embodiments of the invention.
Figure 16:
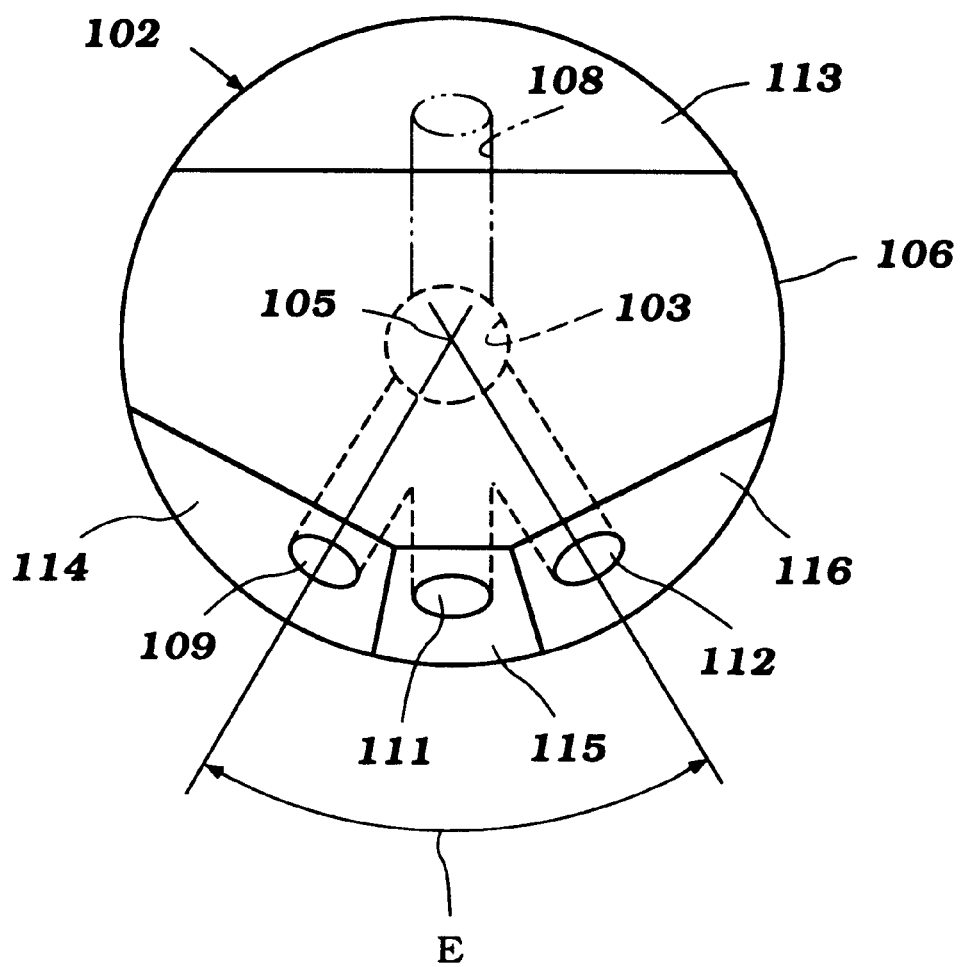
FIG. 16 is a view, in part similar to FIG. 4 but shows the injection nozzle in accordance with this engine embodiment.

An engine constructed in accordance with another embodiment is illustrated in FIGS. 15 and 16 and is identified therein by the reference numeral 101. Since the basic engine including the spark plug location is the same as the embodiment previously described, those components which are the same or substantially the same as that embodiment have been identified by the same reference numerals and will not be described again, except insofar as is necessary to understand the construction and operation of this embodiment.

In this embodiment, a fuel injector, indicated generally by the reference numeral 102 is mounted directly in the cylinder head 24 and has its nozzle tip 103 received in a bore 104 that terminates in the cylinder head recess 37. This position is adjacent one side of the spark plug 68 and particularly its gap 69. The axis of the fuel injector 102 is indicated by the line 105 and it will be seen that this is at a somewhat shallow angle to a horizontal plane.

Because of this different location, the injector tip, indicated by the reference numeral 106 and shown in most detail in FIG. 16 is different from the previously described embodiment. Again, the injector is provided with a injector valve (not shown) that controls the flow to a central supply passage 107 that terminates at a generally horizontally directed nozzle portion 108 and three downwardly directed nozzle portions 109, 111 and 112. The nozzle port 108 opens through a beveled surface 113 of the nozzle tip 106 and sprays in a almost horizontal direction to provide a spray patch 114 (FIG. 15) that passes in proximity to the spark gap 69 and thus will ensure good combustion.

The nozzle portions 109, 111 and 112 open through three angularly disposed flat surfaces 114, 115 and 116. The nozzle portions spray downwardly in three patches 117 toward the head 36 of the piston 29. The angle E between the outer peripheral nozzle tips is the same as that used in the previously described embodiment.

Aside from these differences, this embodiment is the same as that previously described and further description of is not believed to be necessary to enable those skilled in the art to practice the invention. Any of the aforenoted control strategies and/or ignition circuits may be employed with this engine embodiment.

Thus, from the foregoing description it should be readily apparent that the described construction and control methodologies permits direct injection in an engine and will ensure that there is complete combustion even if there may be poor fuel vaporization during certain operating conditions. Although several embodiments of the invention have been illustrated and described, it should be readily apparent to those skilled in the art that various changes and modifications may be made without departing from the spirit and scope of the invention, as defined by the appended claims.

What is claimed is:

1. An internal combustion engine having at least one combustion chamber, a fuel injector for injecting fuel directly into said combustion chamber, at least one spark plug positioned in said combustion chamber for firing a charge therein, an ignition system for controlling the firing of said spark plug, at least two sensors for sensing at least two different engine running conditions at least one of which comprises the air fuel ratio, means for delivering the output from the sensors to said ignition system for controlling the timing of firing of said spark plug and the number of firings during a single combustion cycle.

2. An internal combustion engine as set forth in claim 1 wherein the other of the sensed conditions is selected from a group comprising engine speed, engine load, steady state running and compression pressure.

3. An internal combustion engine as set forth in claim 2 wherein the other sensed condition is engine speed.

4. An internal combustion engine as set forth in claim 3 wherein the number of firings is increased as the engine speed decreases.

5. An internal combustion engine as set forth in claim 2 wherein the other sensed condition is engine load.

6. An internal combustion engine as set forth in claim 5 wherein the number of firings is increased as the engine load decreases.

7. An internal combustion engine as set forth in claim 1 wherein the number of firings is increased if the air fuel ratio deviates from stoichiometric.

8. An internal combustion engine as set forth in claim 2 wherein the one sensed condition is change in engine speed during steady state running.

9. An internal combustion engine as set forth in claim 8 wherein the number of firings is increased if the engine speed varies.

10. An internal combustion engine having at least one combustion chamber, a fuel injector for injecting fuel directly into said combustion chamber, at least one spark plug positioned in said combustion chamber for firing a charge therein, an ignition system for controlling the firing of said spark plug, at least two sensors for sensing at least two different engine running conditions at least one of which comprises air fuel ratio, means for delivering the output from the sensors to said ignition system for controlling the timing of firing of said spark plug and the duration of firing during a single combustion cycle.

11. An internal combustion engine as set forth in claim 10 wherein the other of the sensed conditions is selected from a group comprising engine speed, engine load, air fuel ratio, steady state running and compression pressure.

12. An internal combustion engine as set forth in claim 11 wherein the other sensed condition is engine speed.

13. An internal combustion engine as set forth in claim 12 wherein the time of firings is increased as the engine speed decreases.

14. An internal combustion engine as set forth in claim 11 wherein the one sensed condition is engine load.

15. An internal combustion engine as set forth in claim 11 wherein the one sensed condition is air fuel ratio.

16. An internal combustion engine as set forth in claim 10 wherein the time of firing is increased if the air fuel ratio deviates from stoichiometric.

17. An internal combustion engine as set forth in claim 11 wherein the other sensed condition is change in engine speed during steady state running.

18. An internal combustion engine as set forth in claim 17 wherein the time of firing is increased if the engine speed varies.

* * * * *

UNITED STATES PATENT AND TRADEMARK OFFICE
CERTIFICATE OF CORRECTION

PATENT NO. : 6,085,733
DATED : July 11, 2000
INVENTOR(S) : Yu Motoyama et al.

It is certified that error appears in the above-identified patent and that said Letters Patent is hereby corrected as shown below:

Column 14, Claim 11, Line 11, delete "air fuel ratio".

Column 14, Claim 14, Line 19, delete "one" and insert --other--.

Signed and Sealed this

First Day of May, 2001

Attest:

NICHOLAS P. GODICI

Attesting Officer     *Acting Director of the United States Patent and Trademark Office*